(12) United States Patent
Shaffer

(10) Patent No.: US 9,210,498 B1
(45) Date of Patent: Dec. 8, 2015

(54) WEARABLE EARBUD CHARGING BAND

(71) Applicant: Alpha Audiotronics, Inc., New York, NY (US)

(72) Inventor: Jonathan Everett Shaffer, Huntingdon Valley, PA (US)

(73) Assignee: Alpha Audiotronics, Inc., New York, NY (US)

( * ) Notice: Subject to any disclaimer, the term of this patent is extended or adjusted under 35 U.S.C. 154(b) by 0 days.

(21) Appl. No.: 14/538,907

(22) Filed: Nov. 12, 2014

(51) Int. Cl.
*H04R 1/10* (2006.01)
*H04R 25/00* (2006.01)

(52) U.S. Cl.
CPC .................................... *H04R 1/1091* (2013.01)

(58) Field of Classification Search
CPC ............ H04R 2225/31; H04R 25/602; H04R 25/554; H04R 25/556; H02J 7/025; H02J 7/0045; H02J 17/00
USPC ................................... 381/312, 74, 322, 323
See application file for complete search history.

(56) References Cited

U.S. PATENT DOCUMENTS

| 7,889,498 | B2 | 2/2011 | Diebel et al. |
| 8,485,404 | B2 | 7/2013 | Monaco et al. |
| 2006/0177082 | A1 | 8/2006 | Solomito et al. |
| 2008/0090622 | A1 | 4/2008 | Kim et al. |
| 2008/0090626 | A1 | 4/2008 | Griffin et al. |
| 2009/0296968 | A1 | 12/2009 | Wu et al. |
| 2010/0104125 | A1* | 4/2010 | Neu et al. ...................... 381/381 |
| 2010/0142740 | A1* | 6/2010 | Roerup ........................ 381/330 |
| 2011/0077061 | A1 | 3/2011 | Danze et al. |
| 2013/0083456 | A1 | 4/2013 | Koenig et al. |
| 2013/0129138 | A1 | 5/2013 | Washington, Jr. |
| 2013/0148839 | A1 | 6/2013 | Stevinson |
| 2013/0238829 | A1 | 9/2013 | Laycock et al. |
| 2013/0265702 | A1 | 10/2013 | Merenda |
| 2014/0120983 | A1* | 5/2014 | Lam .............................. 455/557 |
| 2014/0233181 | A1* | 8/2014 | Harms et al. ............. 361/679.56 |

FOREIGN PATENT DOCUMENTS

WO    WO-2013166326 A1    11/2013

* cited by examiner

*Primary Examiner* — Vivian Chin
*Assistant Examiner* — Ammar Hamid
(74) *Attorney, Agent, or Firm* — Fox Rothschild LLP

(57) ABSTRACT

A wearable electronic band configured to contain a plug to engage a power source, and one or more earbud charging receptacles. The band also contains its own rechargeable battery electrically connected to the receptacles and a power source, such as an external source or an induction coil.

15 Claims, 6 Drawing Sheets

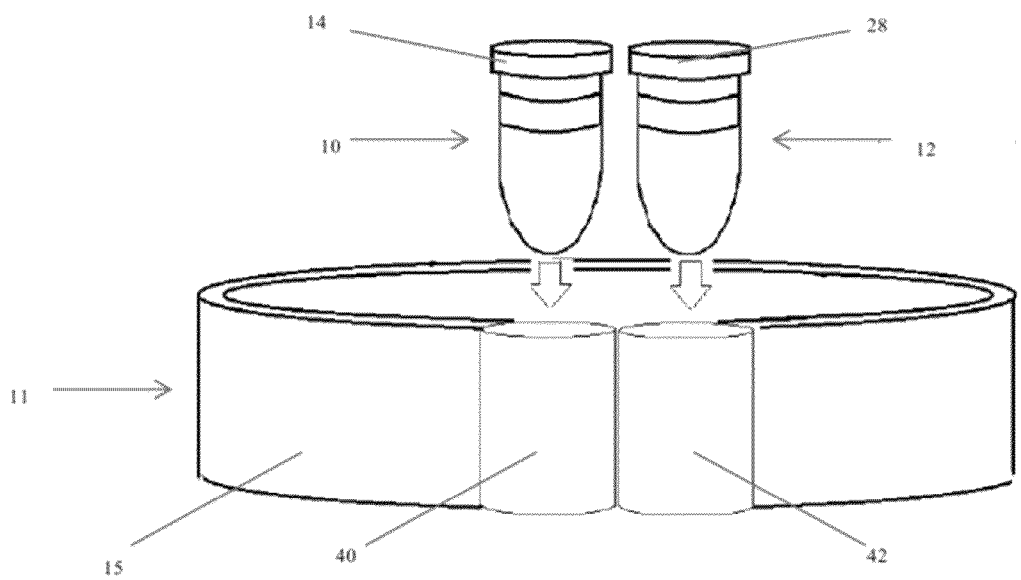
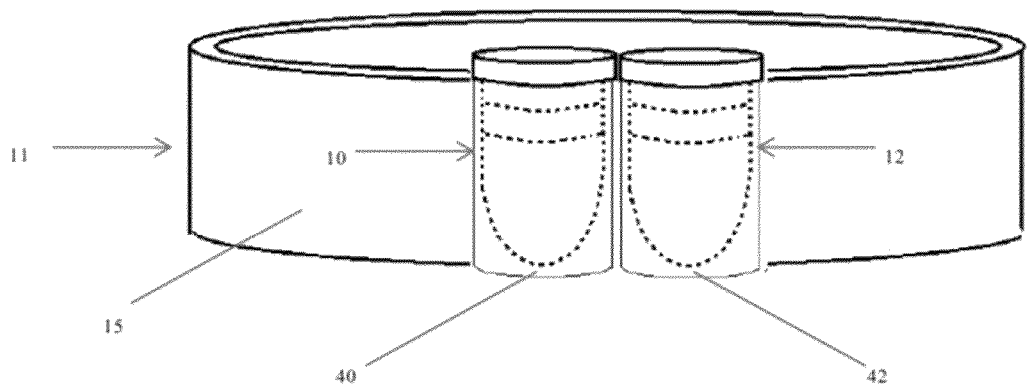

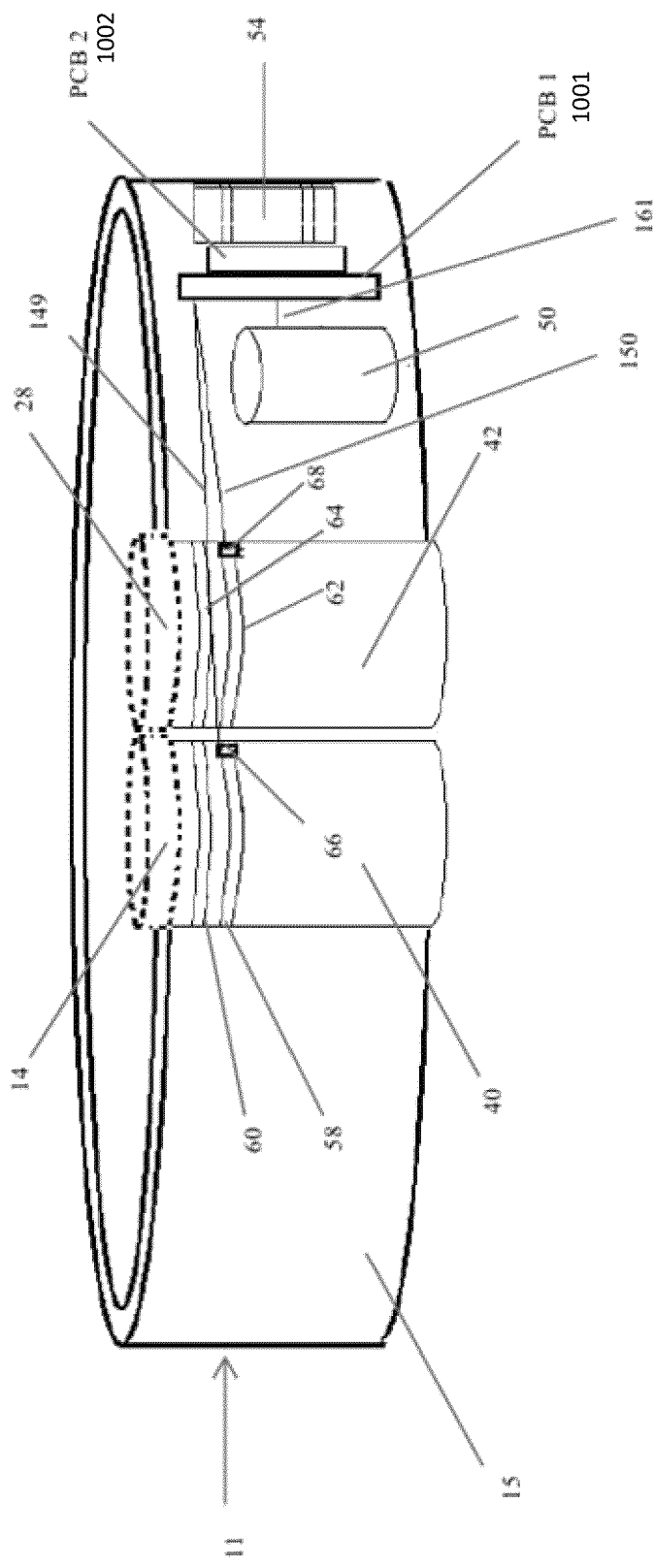

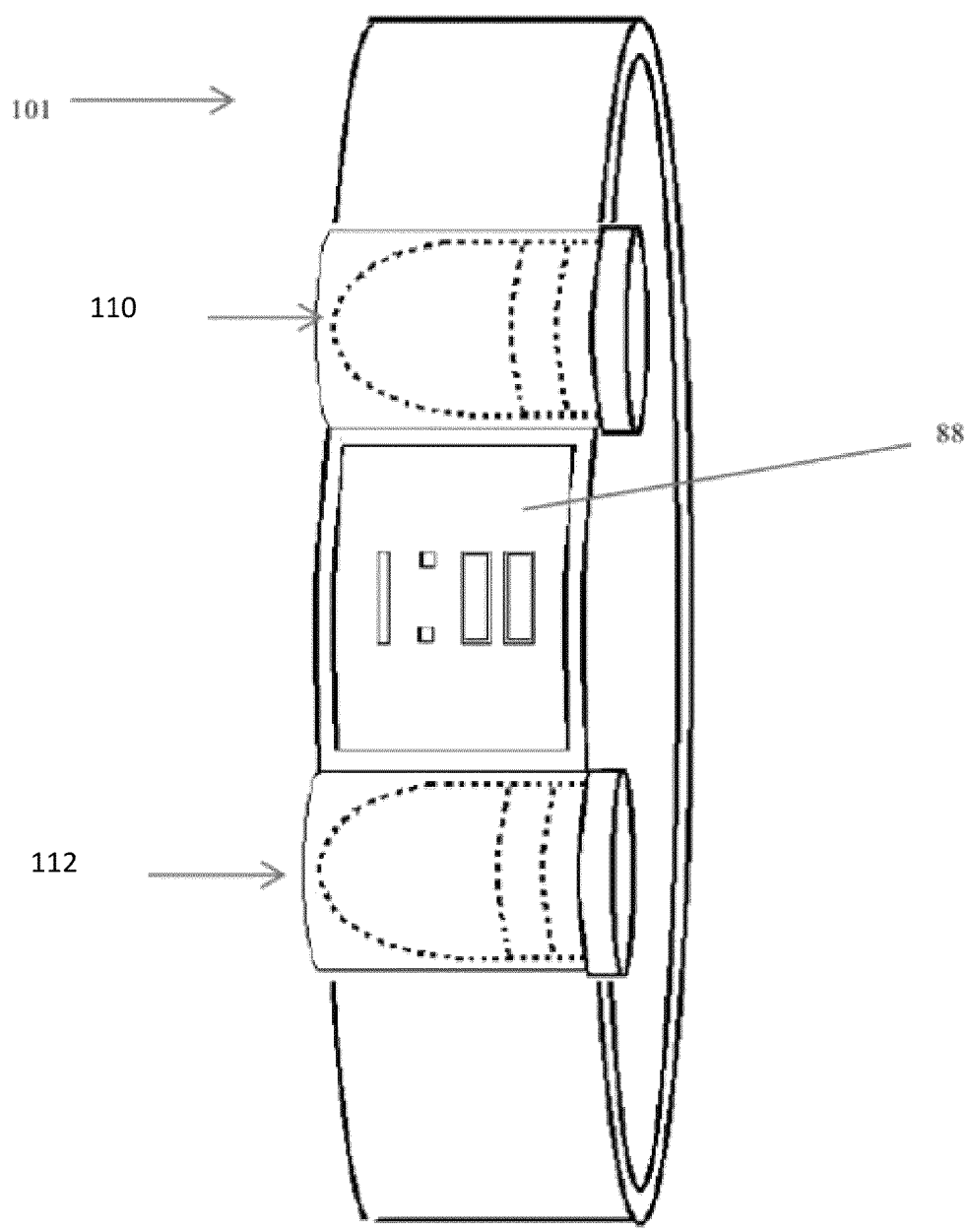

WEARABLE EARBUD CHARGING BAND

BACKGROUND

This patent document relates to a wearable electronic band or smart watch ("wearable earbud charging band") that serves as an electrical charger and storage device for rechargeable wireless audio earbuds.

Wireless audio earbuds ("earbuds") are a convenient way to eliminate tangled wires that impede a user's full range of motion. Wireless earbuds are commonly tethered together (although they communicate wirelessly with a mobile device) in order to prevent loss, given inadequate forms of storage for untethered earbuds. Maintaining wireless earbuds can be inconvenient to a user because they require regular electrical charge.

While there are some limited examples of existing charging devices for wireless earbuds contained within prior art, these concept drawings still create inconveniences that this propose patent eliminates. Integrating earbuds into an electronic band that already requires regular charge and is always available to the wearer should alleviate these challenges.

This document describes a device that addresses some or all of the issues described above.

SUMMARY

In an embodiment, a wearable earbud charging system includes a housing comprising a wearable band and one or more earbud receptacles. Each earbud receptacle is configured to receive an earbud and comprises an electrical contact to engage a rechargeable battery of the earbud when the earbud is positioned within the aperture. The wearable band includes a charging port, a rechargeable battery, and one or more conductors configured to transfer charge from the charging port to the rechargeable battery and to the electrical contact of each earbud receptacle when the charging port is connected to a power source, and to transfer charge from the rechargeable battery and to the electrical contact of each earbud receptacle when the charging port is not connected to a power source.

In an alternate embodiment, a wearable earbud charging system includes a housing comprising a wearable band and one or more earbud receptacles. Each earbud receptacle is configured to receive an earbud and includes an electrical contact to engage a rechargeable battery of the earbud when the earbud is positioned within the aperture. The wearable band includes an induction coil, a rechargeable battery, and one or more conductors configured to transfer charge from the induction coil to the rechargeable battery and to the electrical contact of each earbud receptacle when the induction coil is energized, and to transfer charge from the rechargeable battery and to the electrical contact of each earbud receptacle when the induction coil is not energized. This system also may include an induction charging unit comprising a charging unit induction coil and one or more components configured to electrically connect the induction coil to a power source so that the charging unit induction coil energizes when electrically connected to the power source. The charging unit may be configured to receive the wearable band and transfer charge from the charging unit induction coil to the band induction coil when the band is proximate the charging unit.

In either embodiment, the plug or charging port may be, for example, a mechanically extendable AC plug or multi-pin connector, or a port configured to receive a multi-pin DC cable. Optionally, each earbud comprises a grip having a circular or other shape and a lateral dimension, and each earbud receptacle comprises a cylindrical or other shape and lateral dimension corresponding to that of the grip of each earbud so that when an earbud is placed in one of the earbud receptacles, its earbud grip will extend from the receptacle.

In some embodiments, the earbud charging band may include a first magnet positioned to magnetically retain a first earbud in a first one of the earbud retaining apertures and a second magnet positioned to magnetically retain a second earbud in a second one of the earbud retaining apertures. For example, each earbud receiving aperture may include a magnetic ring positioned to engage and secure the earbud when the earbud is positioned within the aperture. In addition or alternatively, the one or more electrical contacts in each earbud receiving aperture may include a magnet that secures the earbud to the aperture when the earbud is positioned within the aperture. In addition or alternatively, the earbuds may have speakers with magnetic components that engage with magnets or metallic components in the apertures.

BRIEF DESCRIPTION OF THE DRAWINGS

FIGS. 2A and 2B show an embodiment of the charging band where the housing includes a wearable band.

FIG. 3 shows the internal electrical configuration of the earbud charging band.

FIG. 5 illustrates an alternative embodiment of the earbud charging band where earbud charging band is an electronic watch with a spread placement of the earbud apertures.

DETAILED DESCRIPTION

As used in this document, the singular forms "a, "and," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "earbud" refers to a device designed to fit within the ear of a human, and which emits audio signals that the earbud receives from a mobile electronic device. Examples of earbuds include in-ear headphones, hearing aids and the like.

The embodiments described in this document may help eliminate the inconvenience of additional charging cables, wires, and tethered earbuds by: (1) using an electronic band that is connectable to common power sources, to provide electrical charge to wireless earbuds; (2) embedding a magnetic or mechanical dock within the earbud charging band to ensure secure storage and sealed transport of the earbuds; (3) allowing for untethered earbud storage, reducing pull and tangling commonly associated with earbuds connected to a mobile device with a wire and tethered wireless earbuds; and (4) allowing for constant access as a rechargeable band is on a user's person while in use.

Figure 1B:
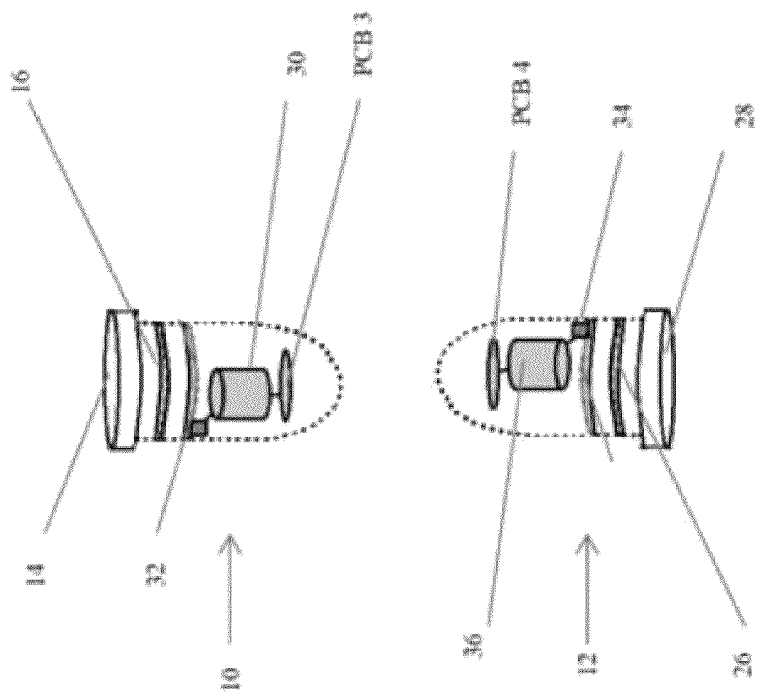
FIG. 1B is a diagram of various electrical components within the wireless audio earbuds shown in FIG. 1A.
Figure 1A:
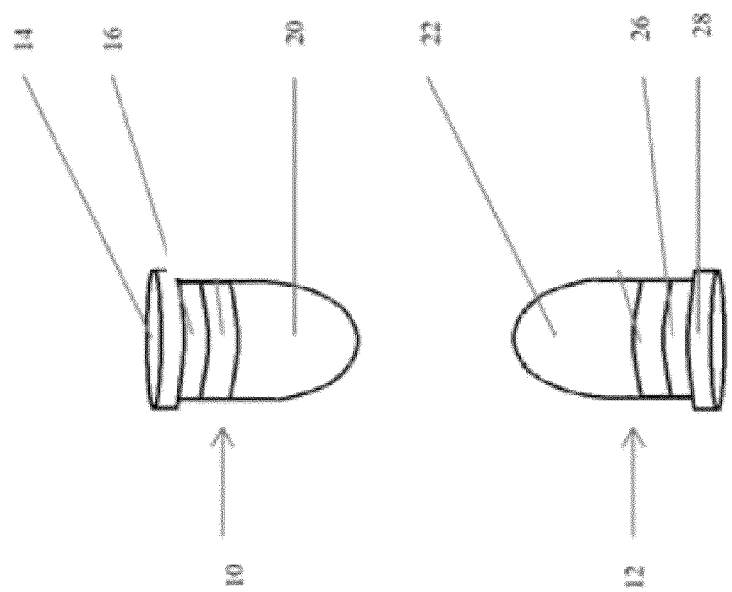
FIG. 1A is a front view of two wireless audio earbuds.

FIG. 1A and FIG. 1B show earbuds 10 and 12 that contain earbud rechargeable batteries 30 and 36 and earbud electrical contacts 32 and 34. The earbuds are outfitted with magnets 16 and 26 that allow a connection with earbud aperture magnets 60 and 64 (see FIG. 3) to ensure that the earbuds remain securely retained within dock apertures 40 and 42 (also shown in FIG. 2). Although ring-shaped magnets are shown and described here, those of skill in the art will appreciate that other shapes and configurations of magnets (e.g., disk, bar) can generate sufficient magnetic attraction to securely retain the earbuds in their respective apertures. The magnets of the earbuds may be attracted to a metal component in the apertures.

Wireless earbuds typically include internal components, such as acoustic components and transmitter and/or receiver components (e.g. Bluetooth®, or near field communication capabilities) that communicate wirelessly with a mobile smart phone or other device. These components may be connected to printed circuit boards PCB 3 and PCB 4 within the earbuds and may contain encoded software or firmware. They may receive communication signals either from a mobile device or from the earbud charging band described in this document. The earbud tips 20 and 22 that contact the user's ear canal may be made from a soft material such as silicone, rubber, resin, photopolymer and the like produced by injection molding or anatomically customized for a user ear canal via 3D printing. The earbud grips 14 and 28 may have a diameter that is larger than that of the tips and may not contact the user's ear but provide a means for users to grasp and remove them from and ear. The grips 14 and 28 may be made of any plastic such as polycarbonate, polypropylene, polyvinyl chloride, photopolymer, resin, metal, alloy, rubber, or other compounds and available in a variety of hues. The earbuds 10 and 12 may also contain electrical contacts 32 and 34, such as one or more leads or prongs that are in contact with a rechargeable battery 30, 36. Each contact 32, 34 can receive a charge from an external source and direct the charge to its earbud's battery 30, 36. Each battery serves as a power source for the circuitry and speaker of its earbud.

In some embodiments, band 11 (FIGS. 2A, 2B) can be outfitted to store and charge in-ear hearing aids via apertures 40 and 42.

Figure 1C:
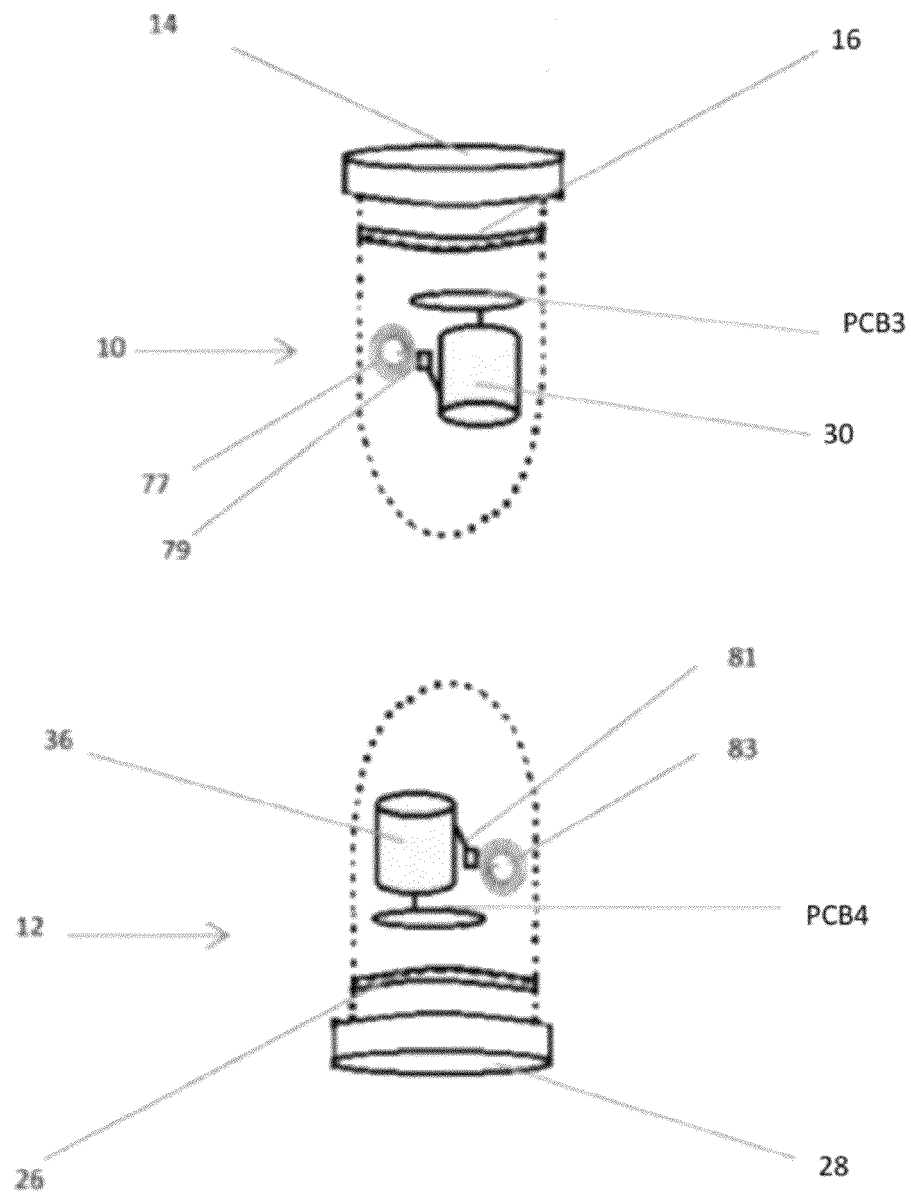
FIG. 1C illustrates an alternate embodiment in which the earbuds include induction coils for charging purposes.

Earbuds contain speakers, and speakers contain magnets. Therefore, in certain embodiments, the earbud magnets 16 and 26 (See FIG. 1C) can be omitted and the earbuds can be held within the earbud apertures 40 and 42 by the magnetic attraction between the aperture magnetic contact strips 60 and 64 and the magnet of a speaker within each earbud, respectively.

Although ring-shaped magnets have been shown and described, those of skill in the art will appreciate that other shapes and configurations of magnets (e.g. disk, bar) can generate sufficient magnetic attraction to securely retain the earbuds in their respective receptacles.

FIGS. 2A and 2B show an embodiment of earbud charging band 11 where the dock is attached to or integral with a wearable band 15. In this embodiment, the housing also includes earbud-receiving receptacles 40, 42. As shown, the receptacles 40, 42 are cylindrical and positioned alongside each other, although other shapes and configurations are possible. Optionally, the earbud apertures 40 and 42 may have a semi-hemispherical shape to allow a user to easily remove an earbud 10 and 12 from the apertures. In other embodiments, the earbud apertures may match the shape of the earbuds they house, which may be of any shape designed to fit within a user ear canal. The earbud receiving apertures are formed in the receptacles to receive the earbuds 10, 12 while leaving at least a portion of the earbud grips 14, 28 exposed as with other embodiments.

The wearable band 15 may be in the form of a wrist or ankle bracelet, wristband, armband, or the like. The wearable band may be made of a flexible or rigid material such as a polymer, rubber, fabric, leather, metal or other material. The band 15 may contain one or more electrical components for charging the earbuds, as described below.

FIG. 3 shows an internal view of the electrical components of band 11. The band contains electrical conductors 149, 150 that may be configured to connect to a power source either through direct contact charge or through induction charging coils embedded in the power source and a second coil embedded in the band. The earbud apertures 40 and 42 may be shaped in a fashion to snugly house earbuds 10 and 12. The earbud apertures 40 and 42 may also contain electrically conductive connectors 66 and 68, such as leads or prongs 66 and 68, that electrically connect the power input 54 and/or battery 50 to the dock electrical connectors 66, 68 via the electrical conductors 149, 150. The electrical connectors 66, 68 receive a charge and transfer it to electrically connected contact structures 58 and 62, such as contact rings.

In certain embodiments, the earbuds can be received by and secured in the apertures via mechanical fit such as snap-fit or screw-in, in such a manner so that when securely stored, the electrical earbud contacts (18 and 24 from FIG. 1A) are in electrical contact with aperture contacts 58 and 62. While ring-shaped contacts are shown, in certain embodiments the electrical contact rings may be of any other shape such as bar or circle which allows for contact between the earbud electrical contacts and the aperture electrical contacts.

The wearable earbud charging band 15 and may include charging and battery storage components 50. For example, the band 15 may contain a charging port 54 that includes an extendable or retractable plug for direct connection to a power source. Or, the charging port 54 may be an AC or DC power receptacle configured to receive a plug that may be connected to a power source. In the latter example, the charging port may include a USB port, micro USB port, mini USB port, lightning port or other multi-pin receptacle for receiving a DC power cord; or it may include a two-prong connector for receiving an AC power cord. Other configurations are possible.

The receptacles 40, 42 contain electrical contacts 58, 62 that are electrically connected to the charging port 54 via one or more conductors 149, 150. Thus, when earbuds are placed into the receptacles 40, 42 and connect to the electrical contacts 58, 62, charge is transferred from the charging port 54 to the rechargeable batteries of the earbuds via the conductors 149, 150 and contacts 68, 66. The band also contains a rechargeable battery 50 that is electrically connected to the charging port 54 and the electrical contacts 66, 68 via one or more conductors 161, 149, 150.

When the charging port 54 is connected to a power source the connectors 149, 150, 161 may simultaneously transfer charge from the port 54 to the rechargeable band battery 50 and to the earbud electrical contacts 66, 68 for charging earbuds. The conductors 161 that lead to the battery 50 may also be in electrical contact with the conductors 149, 150 that lead to the earbud electrical contacts 66, 68 so that when the port 54 is not connected to a power source, the battery 50 may discharge and transfer charge to the earbuds via the various connectors 149, 150 and 161 of the electrical components. Optionally, the band 11 also may include a switch that enables a user to selectively open and close the circuit between the battery connectors 161 and the earbud connectors 149, 150 and thus control when the battery will serve to charge the earbuds. Optionally, the device may include a mechanical or electrical switch that automatically engages the battery connectors 161 with the earbud connectors 149, 150 when the port 54 is in a retracted position or not connected to a power source, and which automatically disengages the battery connectors 161 from the earbud connectors 149, 150 when the port 54 is in an extended position or connected to a power source.

As shown in the figure, there may be two (or any number of) printed circuit boards (or "PCBs"), the main PCB1 and PCB2. PCB1 is the main PCB in the example shown, and it may contain such items as a controller, firmware, an authentication chip, and a battery charging circuit. PCB2 may contain a plug connector, such as a USB connect, 30-pin connector, Lightning connector or other connector. Main PCB 1 connects to PCB2 through a conductive element such as a cable, trace or bus. Electrical components contained within band 11 may comprise such components as wires, printed circuit boards, capacitors, resistors, and the like.

In certain embodiments, the apertures may include magnetic contacts 60 and 64 that may also serve as electrical contacts, delivering charge directly to the earbud magnetic contact strips from the power port 54 without the need for additional prongs or leaders. The earbuds 10 and 12 may include magnets 16 and 26 which allow the earbuds to connect with aperture magnetic contact strips 60 and 64 embedded within earbud apertures 40 and 42 to hold the earbuds within those earbud apertures.

Figure 4:
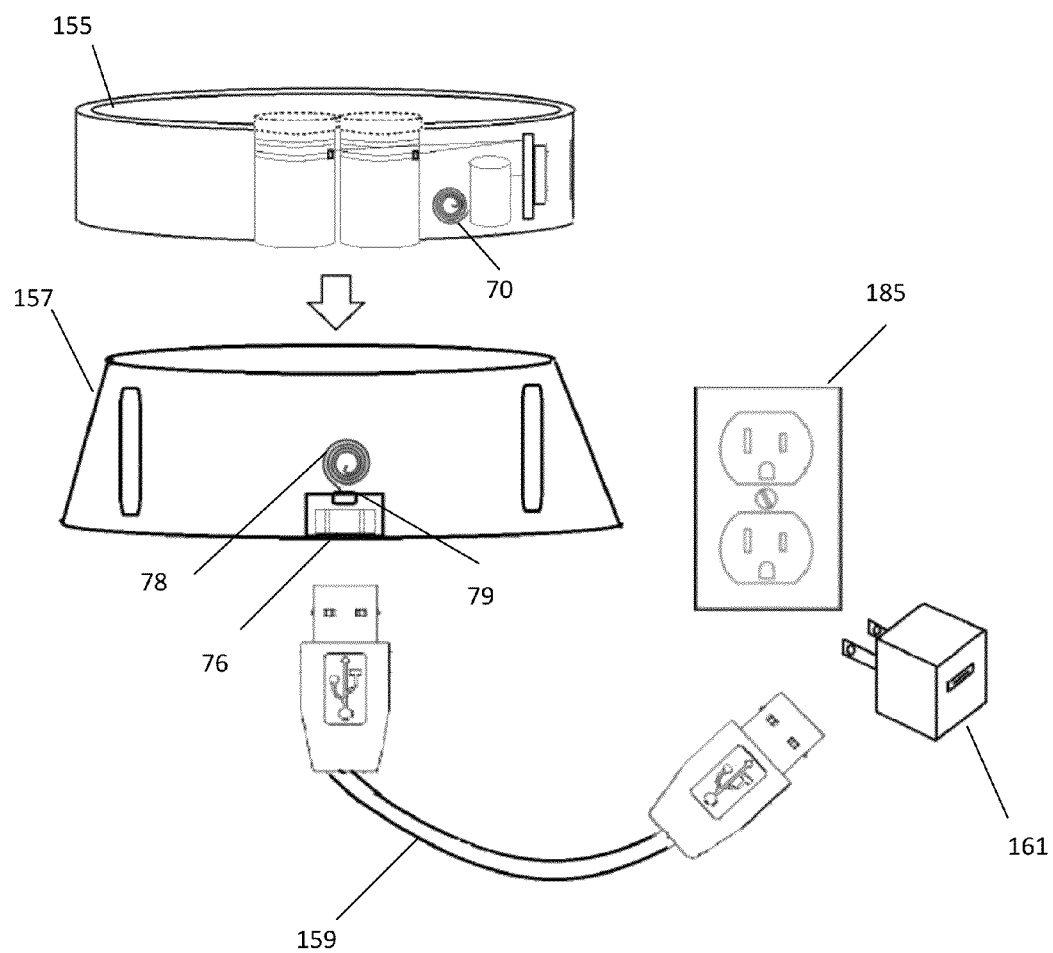
FIG. 4 illustrates an embodiment of the wearable band with a separate charging station.

FIG. 4 illustrates an embodiment where the band 155 may be charged by an external charging station 157 such as a charging tube, mat, tray, cradle seat or other device that can contact and receive the band 555 and energize an inductive coil 70 in the band when in the presence of the induction charging station 157. In this instance the charging station coil 78 can inductively couple with the dock coil 70 which can then either inductively charge the earbuds or convert the electromagnetic field into direct current via a transformer and directly provide charge to the earbud aperture electrical contacts (using structure such as that shown in FIG. 4). The band 155 itself may serve as the source of induction charge for earbuds by applying the current from a power input jack to band coil 70, which will create an electromagnetic field to inductively charge earbud batteries via earbud induction coils in conjunction with earbud electrical transformers 81 and 79. (See FIG. 1C.) Or, the charging station 157 may include a power input jack 76 that connects to an external power source 185 via a cable 159 and plug 161. The station will include a contact 79 that electrically connects the jack 76 to the induction coil 78 to charge the coil when the power source is connected.

For example, the band 155 itself can serve as the source of induction charge for earbuds by applying the current from the power input jack 54 (shown in the embodiment of FIG. 3) to band coil 70, which will create an electromagnetic field to inductively charge earbud batteries 30 and 36 via earbud induction coils 77 and 83 in conjunction with electrical transformers 81 and 79. (See FIG. 1C.) The band coil may be associated with an aperture by being electrically connected to the aperture, or simply by being positioned proximal to the aperture so that an electromagnetic field generated by the aperture coil will extend to its associated aperture. Thus, the coil of the band may inductively couple with the coils of the earbuds so that energy transfers from the band coil to the earbud coils.

Or, alternatively an external induction charging unit could be a tube, mat, tray or other device can electrify band coil 70 when in the presence of the induction charging unit. In this configuration, when a band 155 is placed within the range of an electromagnetic field of an induction charging unit, induction coil 70 embedded within band will create an electromagnetic field that the earbuds 10 and 12 will enter when placed in the earbud apertures. In this instance the charging station coil can inductively couple with band coil which can then either inductively charge the earbuds or convert the electromagnetic field into direct current and directly provide charge to the earbud via aperture electrical contacts.

In a third variation, the external induction charging unit may transfer charge directly to earbud coils when the earbuds are placed in the induction charging station, or within the range of an electromagnetic field generated by the station when the station is connected to a power source, within or without the band.

Induction coils may be embedded within each of the earbuds to transform the electromagnetic field created by charging unit coil. The earbud induction coils direct the electric current to earbud rechargeable batteries, thus delivering at least partial charge to earbuds. For example, each of the band's receptacles may include or be in conductive communication with an induction coil that, when placed within range of the induction charging unit, will transform an electromagnetic field received from the induction charging unit into electric current and transfer the current to the electrical contact of the receptacle. Alternatively, the power source may be connected by a power cable. If so, then each of the apertures may be in conductive communication with an induction coil that is also connected to the power cable input so that when each induction coil is energized, it will generate an electromagnetic field that transfers energy to an associated induction coil of each earbud when placed in the receptacle(s). The case also may be a case system that includes one or more earbuds, each of which is positioned to fit within one of the earbud receptacles, and each of which further comprises an induction coil or one or more other electrical components configured to receive a charge from the case.

FIG. 5 shows an alternative configuration of the wearable earbud charging band 101 shown previously in FIGS. 2-4. In this variation, the earbud apertures 10 and 12 are separated by an LCD or other display 88 embedded within the band. Any of the printed circuit boards within the band may include a processor and memory device containing programming instructions that, when executed by the processor, cause the display to output a user interface (such as touch screen) that allows a user to control operation of the earbuds or the charging band. The controls included in the interface may include those such as simple play/pause controls for audio. The source of the audio may be one or more audio files within the band or received by a receiver of the band through a communication link to a data-connected device. The LCD may also visually present information to the user based upon data feedback from sensors embedded with the band such as outside temperature or user heart rate. Alternatively, or in conjunction with this, when connected to a phone, the band may allow the band's display to serve as a control for the connected mobile device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A wearable earbud charging system, comprising: a housing comprising: one or more earbud receptacles, and a wearable band; wherein: each earbud receptacle is configured to receive an earbud and comprises an electrical contact to engage a rechargeable battery of the earbud when the earbud is positioned within the aperture, each earbud comprises a tip configured to contact a user's ear and a grip that is larger than the tip and is configured to be grasped by the user, and each earbud receptacle is configured to receive and secure its corresponding earbud so that the earbud's tip is within the receptacle and the earbud's grip will extend from the receptacle; and wherein the wearable band comprises: a charging port, a rechargeable battery, and one or more conductors configured to transfer charge from the charging port to the rechargeable battery and to the electrical contact of each earbud receptacle when the charging port is connected to a power source, and to transfer charge from the rechargeable battery to the electrical contact of each earbud receptacle when the charging port is not connected to a power source.

2. The system of claim 1, wherein the charging port comprises a mechanically extendable AC plug or multi-pin connector.

3. The system of claim 1, wherein the charging port comprises a port configured to receive a multi-pin DC cable.

4. The system of claim 1, wherein:
each earbud comprises a grip having a shape and a lateral dimension; and
each earbud receptacle comprises a shape and lateral dimension corresponding to that of the grip of each earbud so that when an earbud is placed in one of the earbud receptacles, its earbud grip will extend from the receptacle.

5. The system of claim 4, wherein:
the shape of the grip is circular; and
the shape of each receptacle is cylindrical.

6. The system of claim 1, wherein each earbud receptacle comprises a magnet positioned to engage and secure the earbud when the earbud is positioned within the earbud receptacle.

7. The system of claim 1, wherein the one or more electrical contacts in each earbud receptacle comprise a magnet that secures the earbud to the receptacle when the earbud is positioned within the receptacle.

8. A wearable earbud charging system, comprising: a housing comprising: one or more earbud receptacles, and a wearable band; wherein: each earbud receptacle is configured to receive an earbud and comprises an electrical contact to engage a rechargeable battery of the earbud when the earbud is positioned within the aperture, each earbud comprises a tip configured to contact a user's ear and a grip that is larger than the tip and is configured to be grasped by the user, and each earbud receptacle is configured to receive and secure its corresponding earbud so that the earbud's tip is within the receptacle and the earbud's grip will extend from the receptacle; and wherein the wearable band comprises: an induction coil, a rechargeable battery, and one or more conductors configured to transfer charge from the induction coil to the rechargeable battery and to the electrical contact of each earbud receptacle when the induction coil is energized, and to transfer charge from the rechargeable battery to the electrical contact of each earbud receptacle when the induction coil is not energized.

9. The system of claim 8, further comprising:
an induction charging unit comprising a charging unit induction coil, and one or more components configured to electrically connect the induction coil to a power source so that the charging unit induction coil energizes when electrically connected to the power source;
wherein the charging unit is configured to receive the wearable band and transfer charge from the charging unit induction coil to the induction coil of the band when the band is proximate the charging unit.

10. The system of claim 8, wherein:
each earbud comprises a grip having a shape and a lateral dimension; and
each earbud receptacle comprises a shape and lateral dimension corresponding to that of the grip of each earbud so that when an earbud is placed in one of the earbud receptacles, its earbud grip will extend from the receptacle.

11. The system of claim 10, wherein:
the shape of the grip is circular; and
the shape of each earbud receptacle is cylindrical.

12. The system of claim 8, wherein each earbud receptacle comprises a magnet positioned to engage and secure the earbud when the earbud is positioned within the earbud receiving aperture.

13. The system of claim 8, wherein the one or more electrical contacts in each earbud receptacle comprise a magnet that secures the earbud to the earbud receptacle when the earbud is positioned within the earbud receptacle.

14. The system of claim 1, wherein the wearable band comprises the form of a wrist bracelet, ankle bracelet, wristband, or armband.

15. The system of claim 8, wherein the wearable band comprises the form of a wrist bracelet, ankle bracelet, wristband, or armband.

* * * * *